US006980349B1

(12) United States Patent
Huibers et al.

(10) Patent No.: US 6,980,349 B1
(45) Date of Patent: Dec. 27, 2005

(54) MICROMIRRORS WITH NOVEL MIRROR PLATES

(75) Inventors: Andrew Huibers, Palo Alto, CA (US); Satyadev Patel, Sunnyvale, CA (US)

(73) Assignee: Reflectivity, Inc

( * ) Notice: Subject to any disclaimer, the term of this patent is extended or adjusted under 35 U.S.C. 154(b) by 0 days.

(21) Appl. No.: 10/927,560

(22) Filed: Aug. 25, 2004

(51) Int. Cl.[7] ................................................ G02B 26/00

(52) U.S. Cl. ...................... 359/291; 359/223; 359/295; 359/298

(58) Field of Search ................................ 359/290, 291, 359/292, 295, 220, 222, 230, 320, 322, 298

(56) References Cited

U.S. PATENT DOCUMENTS

| | | | | |
|---|---|---|---|---|
| 4,566,935 | A | 1/1986 | Hornbeck | |
| 4,615,595 | A | 10/1986 | Hornbeck | |
| 5,061,049 | A | 10/1991 | Hornbeck | |
| 5,083,857 | A | 1/1992 | Hornbeck | |
| 5,784,190 | A | 7/1998 | Worley | |
| 5,835,256 | A | 11/1998 | Huibers | |
| 6,028,690 | A | 2/2000 | Carter et al. | |
| 6,046,840 | A | 4/2000 | Huibers | |
| 6,469,821 | B2 * | 10/2002 | Bartlett et al. | 359/292 |
| 6,522,454 | B2 | 2/2003 | Meier et al. | |
| 6,523,961 | B2 | 2/2003 | Ilkov et al. | |
| 6,529,310 | B1 | 3/2003 | Huibers et al. | |
| 6,804,039 | B1 | 10/2004 | Doan et al. | |
| 6,867,897 | B2 | 3/2005 | Patel et al. | |
| 6,873,450 | B2 | 3/2005 | Patel et al. | |
| 6,885,493 | B2 * | 4/2005 | Ljungblad et al. | 359/290 |
| 2002/0024641 | A1 | 2/2002 | Ilkov et al. | |
| 2003/0214639 | A1 | 11/2003 | Patel | |
| 2004/0004753 | A1 | 1/2004 | Pan | |
| 2004/0125346 | A1 | 7/2004 | Huibers | |
| 2004/0156089 | A1 | 8/2004 | Doan | |
| 2004/0156090 | A1 | 8/2004 | Patel et al. | |
| 2004/0233505 | A1 | 11/2004 | Huibers et al. | |
| 2005/0018091 | A1 | 1/2005 | Patel et al. | |

FOREIGN PATENT DOCUMENTS

| | | |
|---|---|---|
| WO | WO 2004/000720 | 12/2003 |
| WO | WO 2004/001487 | 12/2003 |
| WO | WO 2004/001717 | 12/2003 |
| WO | WO 2004/109363 | 12/2004 |
| WO | WO 2004/109364 | 12/2004 |

* cited by examiner

*Primary Examiner*—Hung Xuan Dong
*Assistant Examiner*—Tuyen Tra
(74) *Attorney, Agent, or Firm*—Gregory R. Muir

(57) ABSTRACT

A spatial light modulator is disclosed, along with methods for making such a modulator. The spatial light modulator comprises an array of micromirrors each of which comprises a deflectable and reflective mirror plate. For enabling the deflection of the mirror plate, incisions are made within the area of the mirror plate with each incision being fully enclosed within the area of the mirror plate. The incisions collectively define a deformable hinge that is on the same plane as the mirror plate at the non-deflected state.

29 Claims, 9 Drawing Sheets

MICROMIRRORS WITH NOVEL MIRROR PLATES

TECHNICAL FIELD OF THE INVENTION

The present invention is related generally to spatial light modulators, and, more particularly, to spatial light modulators with micromirror arrays and hinge structures and methods of making the same.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

The present invention relates to SLMs having reflective micromirrors that are provided within a micromirror array for, e.g., projection-type displays (or for steering light beams, maskless lithography and maskless micro array production). A simplified such display system is illustrated in FIG. 1. In its very basic configuration, display system 100 comprises light source 102, optical devices (e.g. light pipe 104, condensing lens 106 and projection lens 108), display target 112 and spatial light modulator 110 that further comprises a plurality of micromirror devices (e.g. an array of micromirror devices). Light source 102 (e.g. an arc lamp) emits light through the light integrator/pipe 104 and condensing lens 106 and onto spatial light modulator 110. The micromirrors of the spatial light modulator 110 are selectively actuated by a controller (e.g. as disclosed in U.S. Pat. No. 6,388,661 issued May 14, 2002 incorporated herein by reference) so as to reflect—when in their "ON" position—the incident light into projection optics 108, resulting in an image on display target 112 (screen, a viewer's eyes, a photosensitive material, etc.). Generally, more complex optical systems, such as systems employing more than three spatial light modulators (each being designated for modulating one of the three primary colors—red, green, and red) are often used, especially in displaying applications for color images.

Currently, varieties of MEMS-based SLMs for use in display systems have been developed. Regardless of the differences, a common basic configuration of the MEMS-based SLMs comprises a hinge and a micromirror plate that is attached to the hinge for rotating relative to the substrate by the hinge. And the mechanism of the MEMS-based SLMs for display is based on rotating the micromirror plate of individual micromirrors along the hinge at different angles, thus reflecting incident light onto or away from a display target at the different angles. In this regard, mechanical properties of the hinge, the micromirror plate and the attachment of the two are critical factors to the overall performance of the micromirrors and the quality of the displayed images.

Therefore, what is needed is a spatial light modulator having micromirrors devices with robust mechanical properties for use in display systems.

SUMMARY OF THE INVENTION

In view of the foregoing, the present invention provides a micromirror having a deformable torsion hinge that is defined by the enclosed incisions within the mirror plate of the micromirror. The objects and advantages of the present invention will be obvious, and in part appear hereafter and are accomplished by the present invention. Such objects of the invention are achieved in the features of the independent claims attached hereto. Preferred embodiments are characterized in the dependent claims. In the claims, only elements denoted by the words "means for" are intended to be interpreted as means plus function claims under 35 U.S.C. §112, the sixth paragraph.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

The micromirror of the present invention comprises a reflective deflectable mirror plate that is held on a light transmissive substrate. The mirror plate comprises an enclosed incision within the mirror plate and fully surrounded by the remaining portion of the mirror plate. The enclosed incision, together with the remaining portion of the mirror plate defines a deformable hinge allowing deflection of the mirror plate relative to the substrate. Such defined deformable hinge is a portion of the mirror plate that is fully enclosed within the area of the mirror plate. The deformable hinge is within the same plane as the remaining portion of the mirror plate. Such a mirror plate can held on the substrate by a post that connects the mirror plate and the light transmissive substrate.

As an aspect of the invention, the post for holding the mirror plate can be at a location exposed to the incident light directed onto the mirror plate to be modulated. The post can be connected to the mirror plate such that the mirror plate is operable to rotate asymmetrically— that is the mirror plate can rotate to a larger angle in one direction than in the opposite. Alternatively, the post can be constructed such that the mirror plate rotates symmetrically—that is the mirror plate is operable to rotate to the same angle relative to the substrate but in opposite directions.

Figure 1:
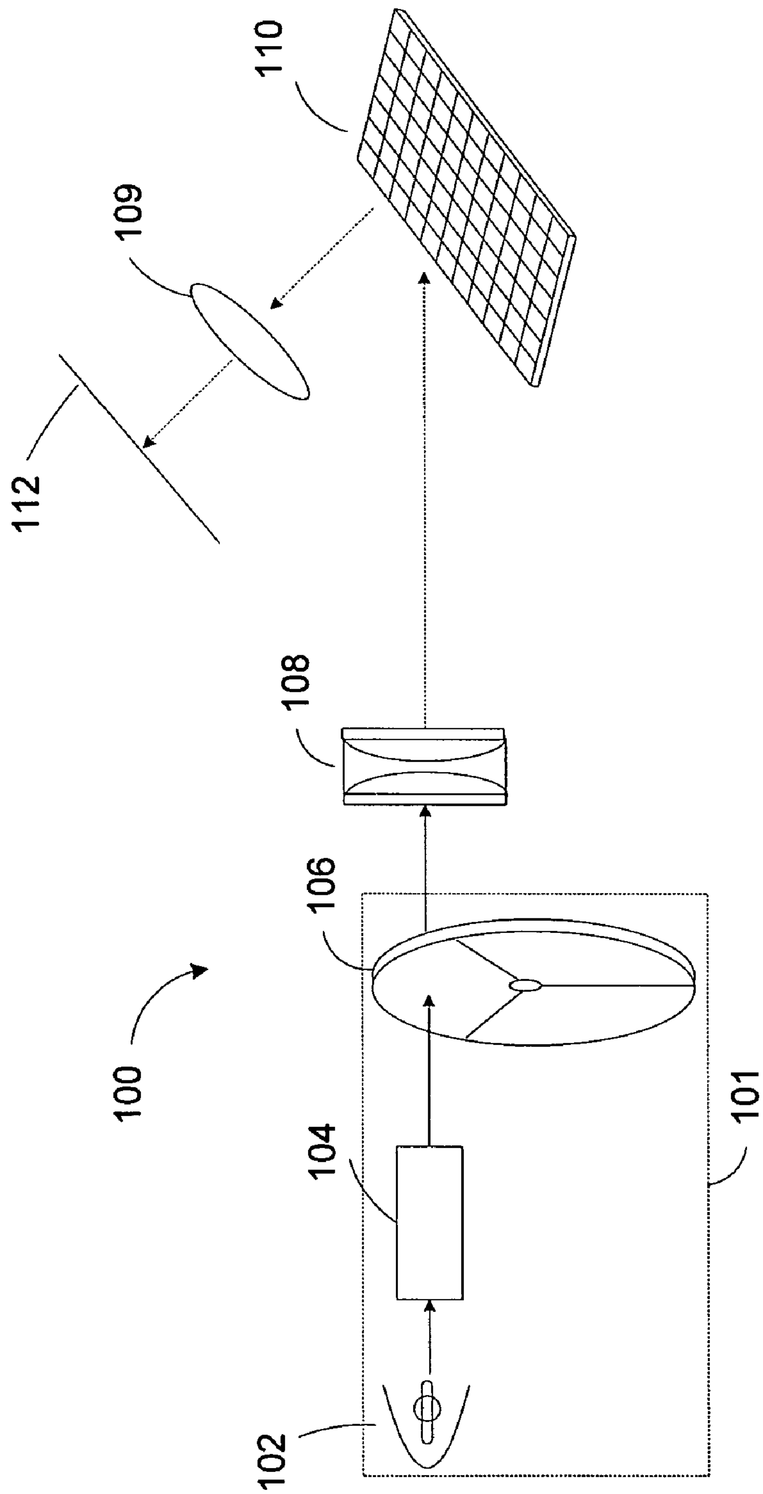
FIG. 1 illustrates an exemplary display system employing a spatial light modulator in which embodiments of the invention can be implemented.

The micromirror of the present invention has many applications, one of which is in spatial light modulators of display systems, one of which is schematically illustrated in FIG. 1. Referring to FIG. 1, in its basic configuration, display system 100 comprises illumination system 101, optical elements 108 and 109, spatial light modulator 110, and display target 112.

The illumination system provides primary color light that are sequentially applied to the spatial light modulator. In an exemplary configuration, the illumination system light source 102, which can be an arc lamp, lightpipe 104 that can be any suitable integrator of light or light beam shape changer, and color filter 106, which can be a color wheel. In this particular configuration, the color wheel is positioned after the light source and lightpipe on the propagation path of the illumination light from the light source. Of course, other optical configurations can also be used, such as placing the color wheel between the light source and the lightpipe. Optical element 108, which can be a condensing lens, directs the primary color light onto the spatial light modulator in which the primary color light is reflected either into or away from projection lens 109 so as to generate a desired image pattern in the display target. The set of primary colors can comprise any set of three or more colors used to render the output image.

In a number of embodiments of the invention, the micromirror array of the spatial light modulator micromirror array has millions of micromirrors depending upon the desired resolution of the display system. For example, the spatial light modulator may have a resolution of 1024×768 or higher, or 1280×1024 or higher, or 1640×1280 or higher. Of course, the micromirror array device may have a fewer number of micromirrors than in display, or other applications, such as optical switching.

The micromirror array, especially used for display systems, can be constructed having a pitch (the center-to-center distance between adjacent micromirrors) of 25 micrometers or less, or 10.16 micrometers or less, or from 4.38 to 10.16 micrometers. The gap between adjacent micromirrors is approximately of 0.5 micrometers or less, or from 0.1 to 0.5 micrometer. And the mirror plate of the micromirror has a dimension of from 20 micrometers to 10 micrometers.

Figure 2:
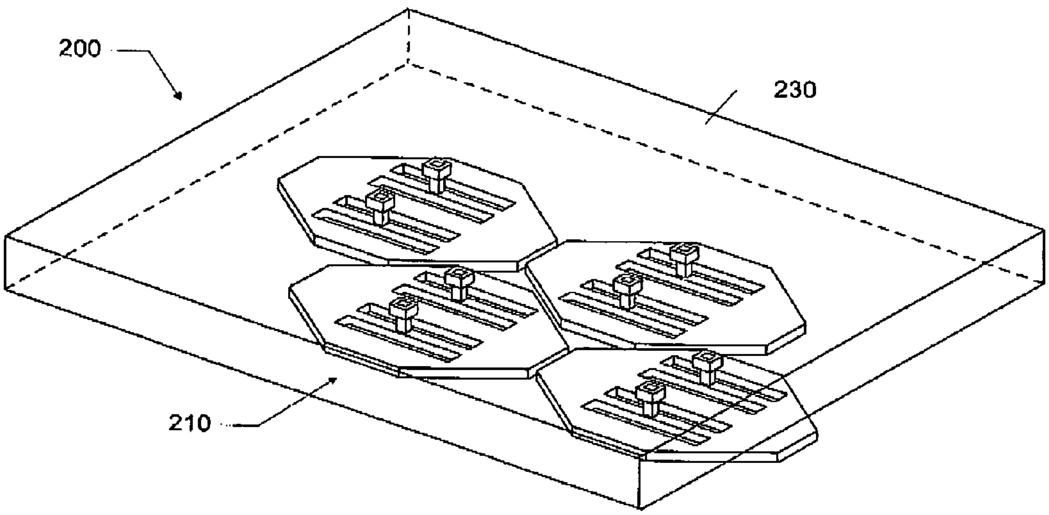
FIG. 2 is a perspective view of a portion of an exemplary spatial light modulator of FIG. 1.

FIG. 2 illustrates a perspective view of a portion of an exemplary spatial light modulator in FIG. 1. For simplicity purposes, only 4×4 micromirrors are presented. Spatial light modulator 200 comprises micromirror array 210 formed on a light transmissive substrate, such as glass or quartz substrate. Each micromirror comprises a reflective deflectable mirror plate held on the substrate by for example, a non-deformable post. The mirror plate has comprises an enclosed incision that is fully surrounded by the area of the mirror plate, which can be better illustrated in FIG. 3.

Figure 3:
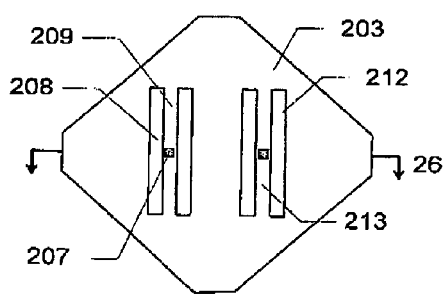
FIG. 3 is a top view of a micromirror in the micromirror array in FIG. 2.

Referring to FIG. 3, a top view of the micromirror is illustrated therein. Within mirror plate 203, incision pairs 208 and 212 are formed. Each incision is enclosed within the mirror plate—that is the incision is fully surrounded by the area of the mirror plate. The incisions, together with the portion of the mirror plate define a deformable hinge (e.g. deformable portions 209 and 213) and a non-deformable portion (e.g. the remaining portions on the mirror plate) such that the mirror plate can be deflected in response to an electrostatic force. With this configuration, the deformable hinge is a portion of the mirror plate and positioned in the same plane as the mirror plate. Moreover, such deformable hinge is enclosed within the mirror plate area. In the particular example as shown in FIG. 3, the incisions of each pair are positioned in parallel. The portion of the mirror plate between the parallel incisions behaves as a deformable hinge.

For holding the mirror plate on the substrate, post 207 is provided. The post can be positioned in any suitable positions according to a particular design. For example, the post can be connected to the deformable hinge such that the mirror plate rotates asymmetrically—that is the mirror plate can rotate to a larger angle in one direction than in an opposite direction. For this purpose, the post can be connected to the mirror plate at a location away from the geometric center of the mirror plate, or not in a diagonal of the mirror plate. When the mirror plate is desired to be rotated symmetrically—that is rotating to the same angle but in opposite directions, the post can be connected to the mirror plate at a location around the center of the mirror plate or at a diagonal of the mirror plate.

Figure 4:
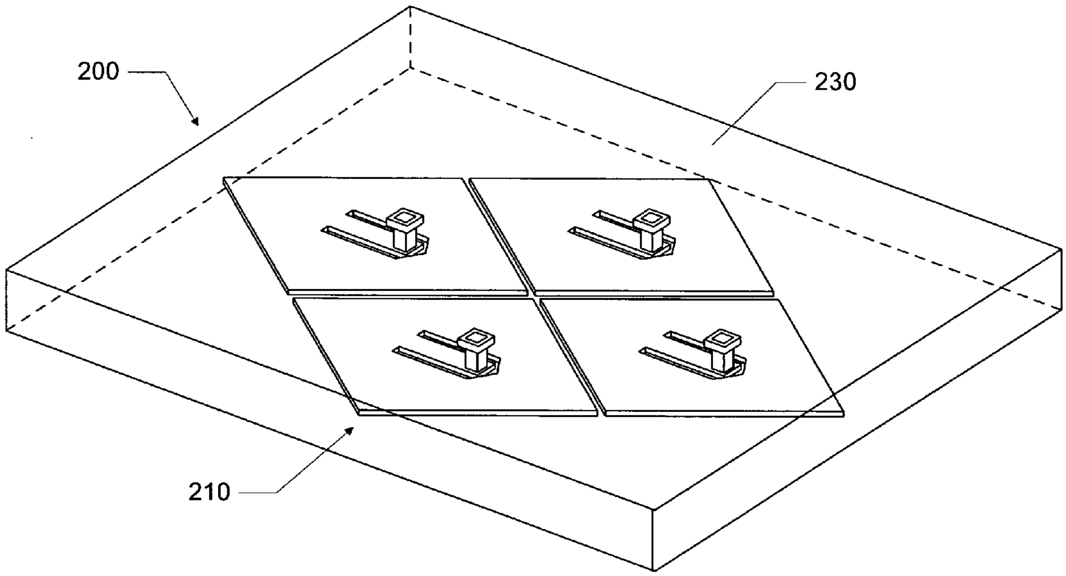
FIG. 4 is a perspective view of a portion of another exemplary spatial light modulator of FIG. 1.
Figure 5:
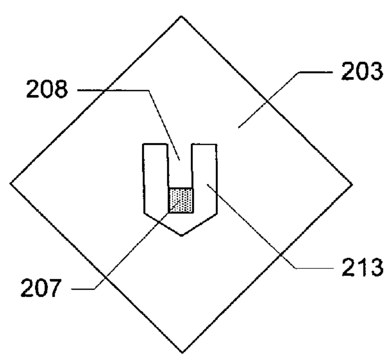
FIG. 5 is a top view of a micromirror in FIG. 4.

The incisions within the mirror plate for providing deformable hinge may take any suitable configurations, such as that shown in FIGS. 4 and 5. Referring to FIG. 4, a "U" shaped incision is made within each mirror plate of the micromirror array in the spatial light modulator. The "U" shaped incision defines a deformable "hinge" that is a portion of the mirror plate. The mirror plate is connected to the glass substrate 233 via the deformable "hinge" and a mirror contact. When the mirror plate is naturally positioned, such as parallel to the substrate, the deformable portion of the mirror plate defined by the "U" shaped incision is in the same plane as the rest portion of the mirror plate. When the mirror plate is deflected with an electrostatic field established between the mirror plate and the electrode on the semiconductor substrate 230, the deformable portion of the mirror plate departs from the plane of the mirror plate. A top view of the micromirror is schematically illustrated in FIG. 5. As shown in FIG. 5, a U shaped incision 213 is made within mirror plate 203. The U shape incision defines mirror plate portion 208 that can be deformed with an electrostatic force. Mirror contact 207 is positioned around one end of the deformable portion 208 for connecting the mirror plate to the substrate.

Figure 6:
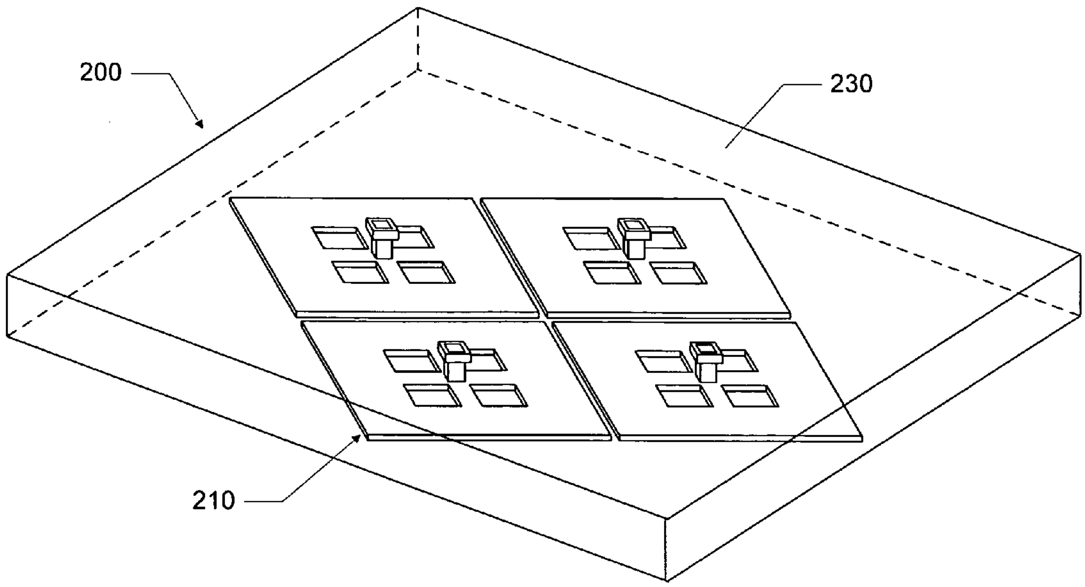
FIG. 6 is a perspective view of a portion of yet another exemplary spatial light modulator of FIG. 1.

FIG. 6 schematically illustrates another exemplary spatial light modulator having an array of micromirrors with each of the micromirror having incisions. In this particular example, the incisions within each mirror plate are squares and positioned around the center of the mirror plate. The squared incisions in each mirror plate collectively define a deformable portion of the mirror plate, such as the portion around the center of the mirror plate. The configuration of the incisions is better illustrated in FIG. 7.

Figure 7:
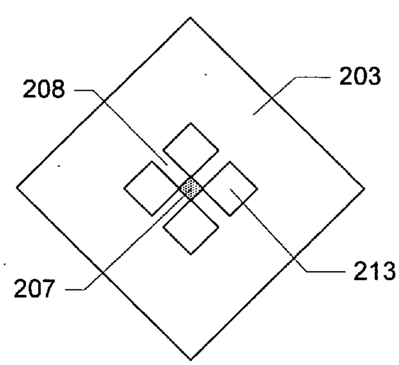
FIG. 7 is a top view of a micromirror in FIG. 6.

Referring to FIG. 7, the top view of a micromirror of the micromirror array in FIG. 6 is illustrated therein. Squared incisions 213 are formed around the center of the mirror plate. A deformable portion in the vicinity of the mirror plate center is thus defined by the incisions. Mirror plate contact 207 is formed at the center of the mirror plate can connected to the substrate.

Figure 8:
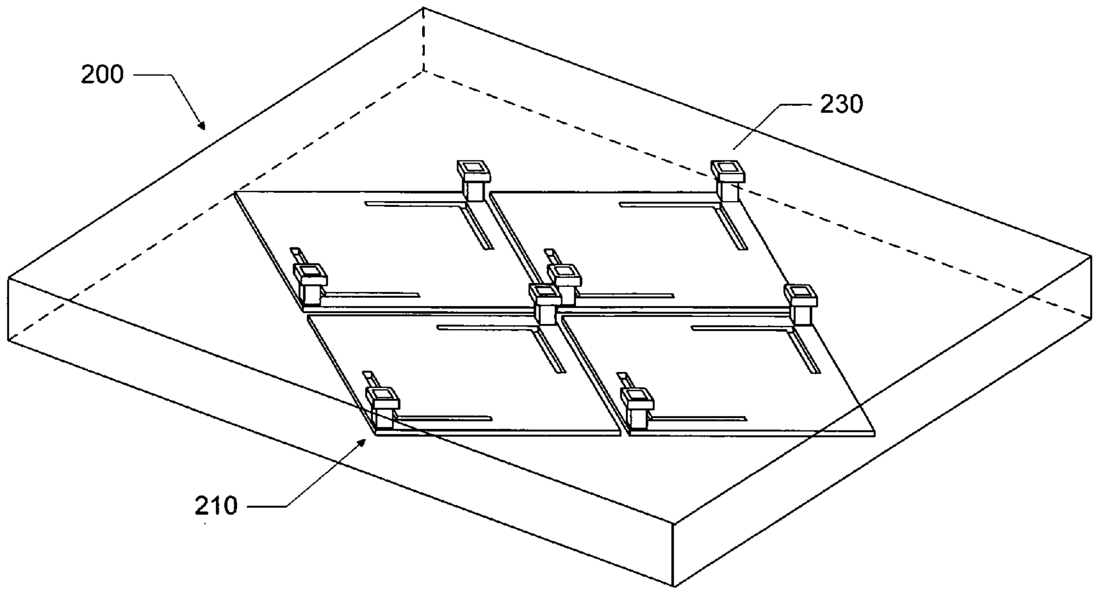
FIG. 8 is a perspective view of a portion of yet another exemplary spatial light modulator of FIG. 1.
Figure 9:
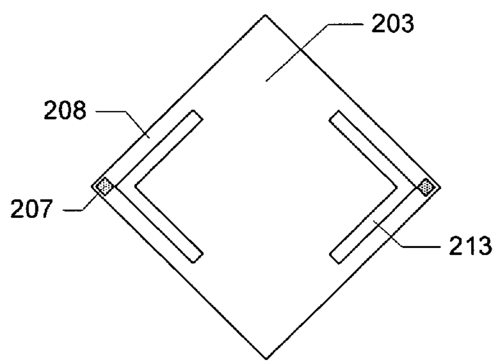
FIG. 9 is a top view of a micromirror in FIG. 8.

FIG. 8 schematically illustrates yet another exemplary spatial light modulator having an array of micromirrors with each of the micromirror having incisions. In this example, L shaped incisions are made within each mirror plate. Specifically, two L-shaped incisions are respectively formed around the opposite corners of the mirror plate with the legs of the L-shaped incisions parallel to the edges the mirror plate. With this configuration, the portion between the incisions and the edges of the mirror plate is deformable and can thus be treated as the deformable hinge of the micromirror. The top view of the micromirror is illustrated in FIG. 9. As shown in FIG. 9, the incisions 213 and 208 are made around the opposite corner of mirror plate 203. Posts 207 are positioned at the opposite corners for holding the mirror plate on the substrate. The lengths of the L shape can be determined according to the mechanical properties of the mirror plate, the desired rotation angle of the mirror plate in operation and other factors, such as the strength of the electrostatic fields used in deflecting the mirror plate.

In the examples discussed above with reference to FIGS. 2 to 9, the incisions are made within the mirror plates, and fully enclosed by the areas of the individual mirror plates. Alternatively, an incision can be made within a mirror plate but connected to the edges of the mirror plate, as will be discussed with reference to FIGS. 10 to 13.

Figure 10:
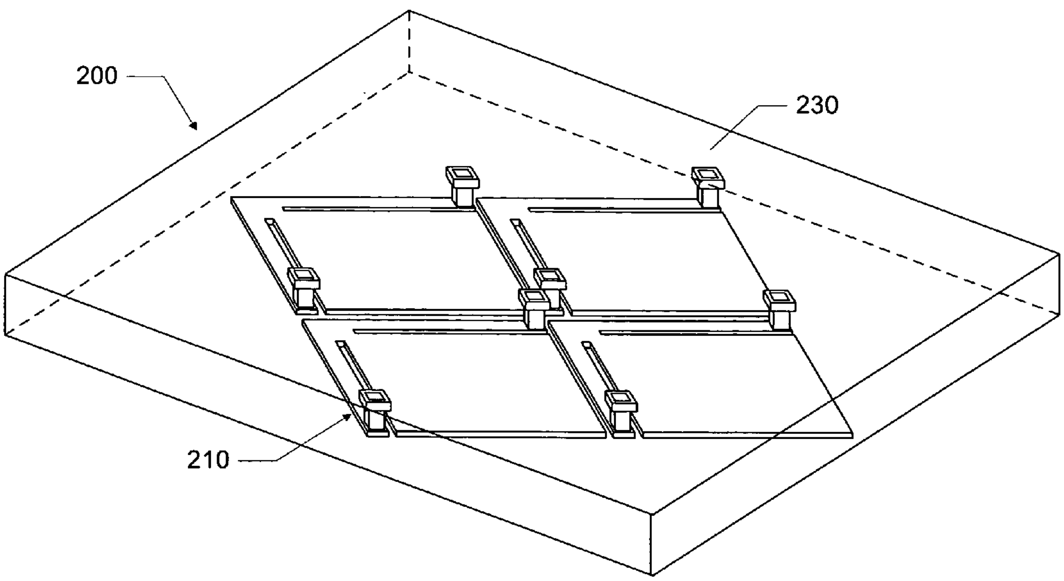
FIG. 10 is a perspective view of a portion of yet another exemplary spatial light modulator of FIG. 1.
Figure 11:
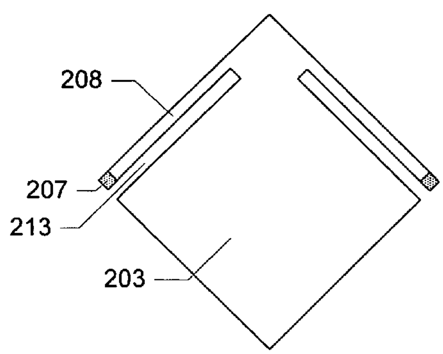
FIG. 11 is a top view of a micromirror in FIG. 10.

FIG. 10 schematically illustrates another exemplary spatial light modulator having an array of micromirrors with each of the micromirror having incisions. In this example, trip incisions are made within each mirror plate. Specifically, two incisions are made within each mirror plate with each incision (e.g. incision 213) defining a deformable strip portion (e.g. strip portion 208) along an edge of mirror plate 203, as better illustrated in FIG. 11, which is the top view of the micromirror. Each of such defined strip portions of the mirror plate is deformable with an electrostatic field in operation. Posts 207 are formed on the ends of the deformed portion for connecting the mirror plate to the substrate.

Figure 12:
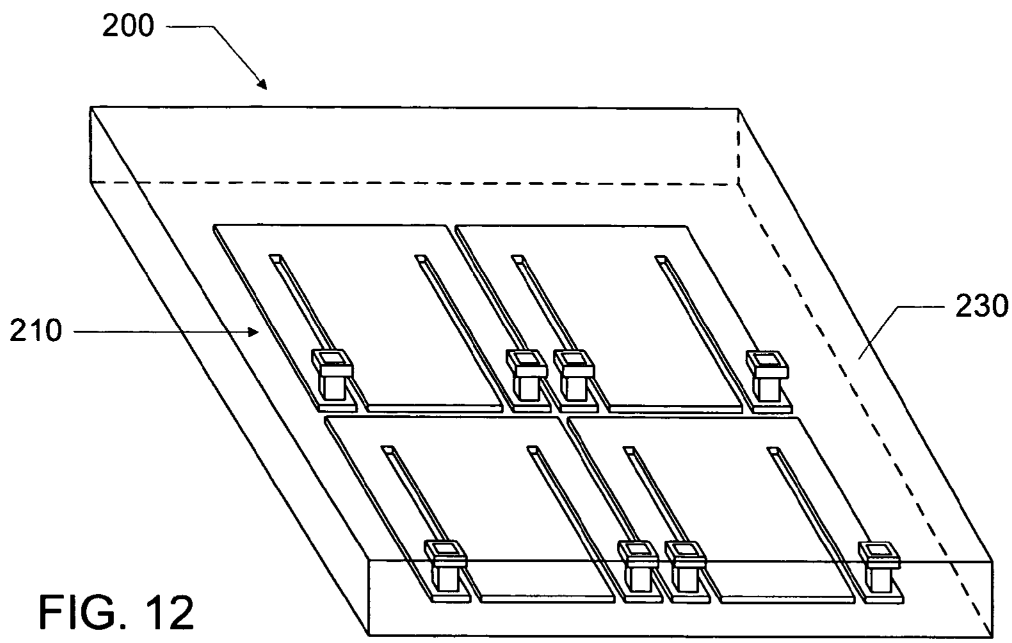
FIG. 12 is a perspective view of a portion of yet another exemplary spatial light modulator of FIG. 1.
Figure 13:
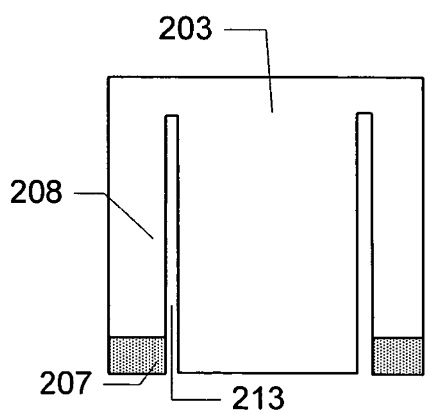
FIG. 13 is a top view of a micromirror in FIG. 12.

FIG. 12 schematically illustrates yet another exemplary spatial light modulator having an array of micromirrors with each of the micromirror having incisions. In this example, trip incisions are made within each mirror plate. Specifically, two parallel incisions are made within each mirror plate with each incision (e.g. incision 213) defining a deformable strip portion (e.g. strip portion 208) along an edge of mirror plate 203, as better illustrated in FIG. 13, which is the top view of the micromirror. Each of such defined strip portions of the mirror plate is deformable with an electrostatic field in operation. Posts 207 are formed on the ends of the deformed portion for connecting the mirror plate to the substrate.

Figure 14A:
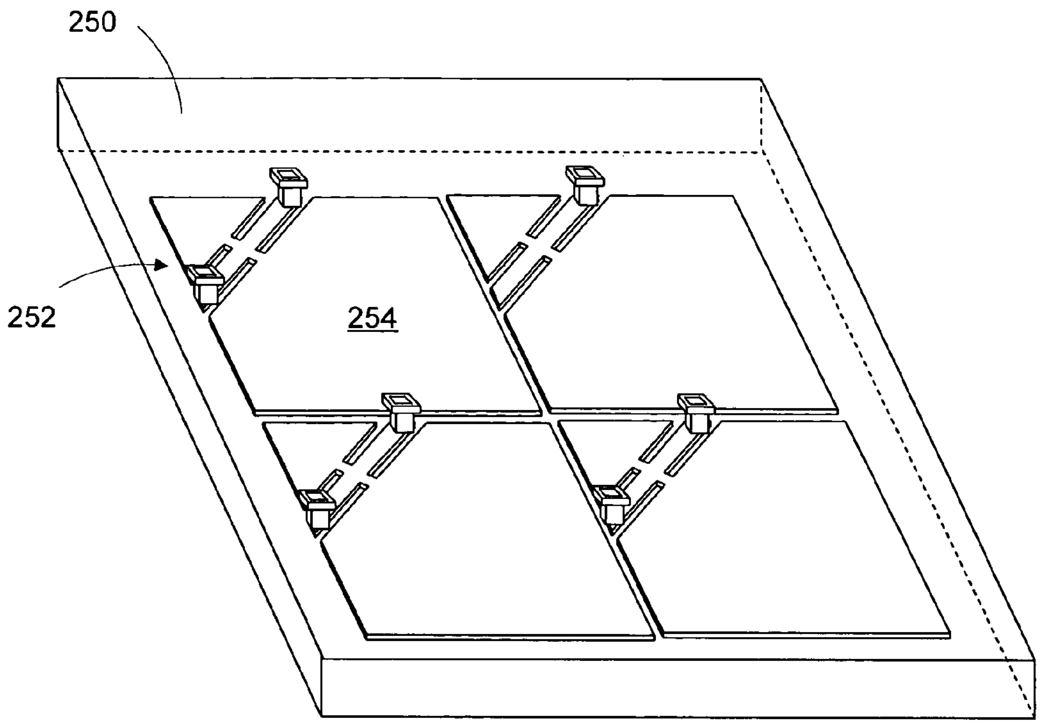
FIG. 14A is a perspective view of a portion of yet another exemplary spatial light modulator of FIG. 1.

Referring to FIG. 14A, a perspective view of a portion of another exemplary spatial light modulator in FIG. 1 is illustrated therein. The spatial light modulator comprises micromirror array 252 that is formed on substrate 250 that is preferably transmissive to visible light, such as glass or quartz. Each micromirror in the array comprises a reflective deflectable mirror plate. Deflection of the mirror plate is enabled by a deformable hinge (e.g. a torsion hinge) that is defined by incisions in the mirror plate, which is better illustrated in FIG. 14B.

Figure 14B:
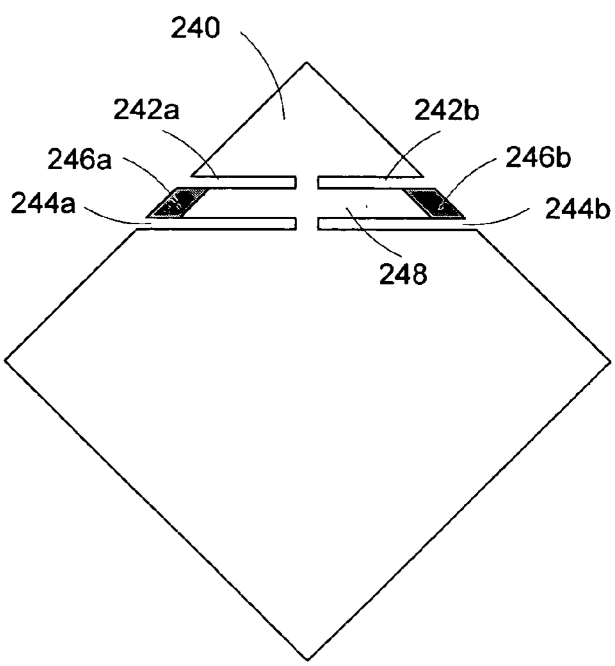
FIG. 14B is a top view of a micromirror in the micromirror array in FIG. 14A.

Referring to FIG. 14B, a top view of micromirror 254 in FIG. 14A is illustrated therein. The deflectable and reflective mirror plate 240 comprises incisions 242*a*, 242*b*, 244*a*, and 244*b* that are arranged in parallel. The incisions collectively defines deformable (torsion) hinge 248 that is in fact a portion of the mirror plate. The deformable hinge can be held by posts 246*a* and 246*b* attached to the opposite ends of the deformable hinge.

In accordance with an embodiment of the invention, the incisions (242*a*, 242*b*, 244*a*, and 244*b*) are made in the mirror plate such that the defined deformable hinge is on the same plane as the mirror plate; and the length of the hinge is preferably parallel to but offset to a diagonal of the mirror plate when the mirror plate is not deflected. In another embodiment of the invention, the hinge is not parallel to any diagonal of the mirror plate.

In the examples described above, the posts of the micromirrors are exposed to the incident light directed to the mirror plate to be modulated. Alternatively, the post can be constructed such that the post is not located within the area of the mirror plate (e.g. when viewed from the top of the mirror plate). Instead of forming the micromirrors on the glass substrate, the micromirrors can also be formed on the semiconductor substrate having thereon an array of electrodes and circuitry for deflecting the mirror plates. In another embodiment of the invention, the micromirror substrate can be formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

The mirror plates of the micromirrors as described above may take any desired shapes, though preferably four-sided or substantially four-sided shapes. The mirror plate may also have zigzagged edges. Because the mirror plate is responsible for reflecting the incident light, the mirror plate is desired to have a reflective surface with high reflectance, such as reflecting 90% or more, or 99% or more incident light. In accordance with the operation mechanism of the micromirror plate and the constructional design, it is desired that the posts comprise materials that are insusceptible to elastic deformation (e.g. fatigue, creep, dislocation motion) during the operation of the device. It is also preferred that such materials have large elastic modulus and exhibits high stiffness. Opposite to that of the posts, the materials of the hinge are expected to be more compliant because the hinge deforms while the micromirror plate pivots. Moreover, the hinge is desired to be electrically conducting such that the micromirror plate can be held at a particular voltage level.

Figure 15A:
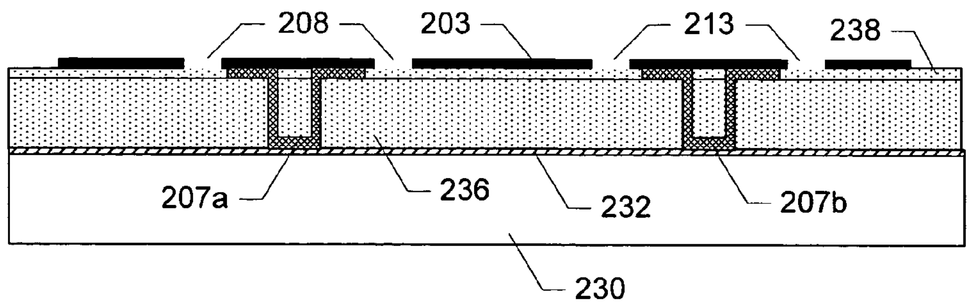
FIG. 15A and FIG. 15B are cross-section views of the micromirror during an exemplary fabrication process according to an embodiment of the invention.
Figure 15B:
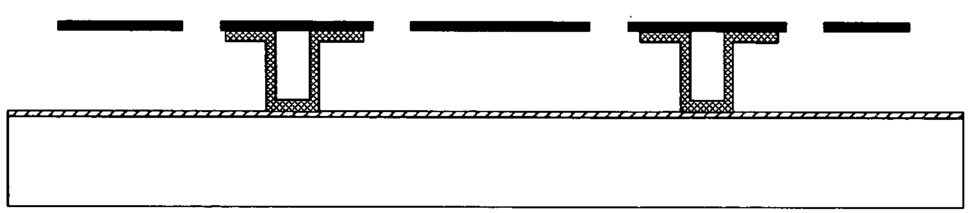

There is a variety of ways to construct the micromirror devices described above. An exemplary process for fabricating micromirror in FIG. 3 will be discussed in the following with references to FIG. 15A and FIG. 15B, wherein FIGS. 15A and 15B are cross-section views of the micromirror in FIG. 3 taken along line 26. It should be appreciated by those ordinary skills in the art that the exemplary processes are for demonstration purposes only and should not be interpreted as limitations.

Referring to FIG. 15A, substrate 230 is provided. First sacrificial layer 236 is deposited on the substrate followed by deposition of a post layer and patterning of the deposited post layer so as to form posts 207*a* and 207*b*. The first sacrificial layer can be of any suitable materials, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300–350° C. The thickness of the first sacrificial layer can be wide ranging depending upon the micromirror size and desired title angle of the micro-micromirror, though a thickness of from 500 Å to 50,000 Å, preferably around 10,000 Å, is preferred. The first sacrificial layer may be deposited on the substrate using any suitable method, such as LPCVD or PECVD.

As an optional feature of the embodiment, anti-reflection layer 232 may be deposited on the surface of the substrate for one embodiment of the invention. The anti-reflection layer is deposited for reducing the reflection of the incident light from the surface of the substrate. Alternatively, other optical enhancing layers may be deposited on either surface of the glass substrate as desired.

After forming the posts, second sacrificial layer 238 is deposited. The thickness of the second sacrificial layer is substantially the same as the portion of the posts above the first sacrificial layer, in which way the surface of the mirror plate is substantially perfectly flat. On the deposited second sacrificial layer, mirror plate layer 203 is deposited and patterned. After the patterning, the mirror plate has the desired shape, and incisions 208 and 213 are properly made. When the mirror plate is fabricated, the sacrificial layers are removed for releasing the mirror plate. The micromirror after releasing is illustrated in FIG. 15B.

The posts and mirror plate of the micromirror may compose of any suitable materials. For example, because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. According to one embodiment of the invention, the micromirror plate is a multi-layered structure. For example, the multilayered hinge may comprise a reflection layer, a protection layer, and an enhancing layer. The reflection layer may comprise one or more materials exhibiting high light reflectivity. Examples of such materials are Al, Ti, AlSiCu or TiAl. In the preferred embodiment of the invention, the light reflecting layer is aluminum with a thickness of 2500 Å. This aluminum layer is preferred to be deposited at 150° C. or other temperatures preferably less than 400° C. The protection layer may be a $SiO_x$ layer with a preferred thickness of 400 Å. The enhancing layer can be comprised of metal or metal alloy for enhancing the electric and mechanical properties of the micromirror plate. An example of such enhancing layer is titanium with a thickness of 80 Å. Of course, other suitable materials having high reflectivity to the incident light of interest may also be adopted for the micromirror plate. In depositing the micromirror plate layer, PVD is preferably used at 150° C. The thickness of the micromirror plate layer can be wide ranging depending upon the desired mechanical (e.g. elastic module), the size of the micromirror, desired titled angle and electronic (e.g. conductivity) properties of the micromirror plate and the properties of the materials selected for forming the micromirror plate. According to the invention, a thickness of from 500 Å to 50,000 Å, preferably around 2500 Å, is preferred.

Because the posts are formed to hold the mirror plate on the substrate, it is natural to expect that the post layer comprises a material that is at least not susceptible to plastic deformation (e.g. fatigue, creep, and dislocation motion). Furthermore, when the posts are used as electric contacts for the micromirror plate, it is desired that the material of the posts is electrically conductive.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates such embodiments as may come within the scope of the following claims and equivalents thereof.

We claim:

1. A projector, comprising:

a light source for providing illumination light for the projector;

a condensing lens for condensing the light from the light source onto a spatial light modulator, said spatial light modulator comprising an array of micromirrors, each of which further comprises:

a substrate;

a mirror plate having a deformable portion and a non-deformable portion, wherein the deformable portion of the mirror plate is defined by an incision that is fully enclosed within an area of the mirror plate and/or the deformable portion of the mirror plate; and a post disposed at the deformable portion of the mirror plate and connecting the mirror plate to the substrate; and a display target.

2. The projector of claim 1, wherein the deformable portion is surrounded by the non-deformable portion.

3. The projector of claim 2, wherein the incision has a U shape.

4. The projector of claim 2, wherein the incision has an L shape.

5. The projector of claim 2, wherein mirror plate has parallel incisions.

6. The projector of claim 2, wherein incision is square shaped.

7. The projector of claim 1, wherein the deformable portion is positioned within the mirror plate.

8. The projector of claim 1, wherein the mirror plate is generally four sided.

9. The projector of claim 1, wherein the spatial light modulator further comprises a circuit substrate positioned below and spaced apart from the visible light transmissive substrate.

10. The projector of claim 9, wherein said circuit substrate comprises an electrode for creating attraction between the mirror plate and the circuit substrate.

11. The projector of claim 1, wherein the mirror plate is held on the bottom surface of the visible light transmissive substrate; and wherein the mirror plate has first and second portions such that during deflection of the mirror plate, the second portion of the mirror plate moves towards the bottom surface as the first portion moves away from the bottom surface.

12. The projector of claim 1, wherein the mirror plate includes a conductive layer.

13. The projector of claim 1, wherein the mirror plate has a zigzagged edge.

14. The projector of claim 13, wherein the mirror plate has a shape that is substantially four sided.

15. The projection of claim 1, wherein the hinge is parallel to but offset from a diagonal of the mirror plate when the mirror plate is not deflected.

16. A method of making a projector, comprising:

providing a light source, a collection lens, a projection lens and a display target;

providing a spatial light modulator, wherein the spatial light modulator comprises:

a substrate that is transmissive to visible light;

a mirror plate having a deformable portion and a non-deformable portion; and a post disposed at the deformable portion of the mirror plate and connecting the mirror plate to the substrate; and arranging the spatial light modulator, the collection lens, the light source, the projection lens and the display target such that, a light beam from the light source is focused by the collection lens onto the mirror plate through the glass substrate, and reflected by the mirror plate, the reflected light being collected by the projection lens and projected onto the display target.

17. A micromirror device, comprising:

a light transmissive substrate; and a mirror plate held on the substrate such that the mirror plate is operable to rotate relative to the substrate, wherein the mirror plate has a deformable portion and a non-deformable portion, the deformable portion being defined by an incision fully enclosed within the mirror plate.

18. The micromirror device of claim 17, further comprising: a post disposed proximate to the deformable portion of the mirror plate and connecting the mirror plate to the substrate.

19. The device of claim 17, wherein the deformable portion is surrounded by the non-deformable portion.

20. The device of claim 17, wherein the deformable portion is positioned within the mirror plate.

21. The device of claim 17, wherein the mirror plate is generally four sided.

22. The device of claim 17, wherein the incision has a U shape.

23. The device of claim 17, wherein the incision has an L shape.

24. The device of claim 17, wherein mirror plate has parallel incisions.

25. The device of claim 17, wherein incision is square shaped.

26. The device of claim 17, wherein the substrate is a semiconductor wafer having thereon an electrode and circuitry for deflecting the mirror plate.

27. The device of claim 17, wherein the substrate is glass that is transmissive to visible light.

28. The device of claim 27, further comprising:

a semiconductor wafer having thereon an electrode and circuitry, the semiconductor wafer being positioned proximate to the glass substrate.

29. The projection of claim 17, wherein the hinge is parallel to but offset from a diagonal of the mirror plate when the mirror plate is not deflected.

* * * * *